March 22, 1960  M. STEINBERG  2,929,526
COASTER WITH A CONDENSATE TRAP
Filed Dec. 31, 1957  2 Sheets-Sheet 1

INVENTOR
MEYER STEINBERG
BY
ATTORNEY.

March 22, 1960 M. STEINBERG 2,929,526
COASTER WITH A CONDENSATE TRAP
Filed Dec. 31, 1957 2 Sheets-Sheet 2

INVENTOR
MEYER STEINBERG
BY
ATTORNEY.

United States Patent Office 2,929,526
Patented Mar. 22, 1960

2,929,526

COASTER WITH A CONDENSATE TRAP

Meyer Steinberg, Woodmere, N.Y.

Application December 31, 1957, Serial No. 706,453

6 Claims. (Cl. 215—100.5)

This invention relates to a coaster with a condensate trap.

The object of this invention is the provision of a coaster which has a built-in condensate trap which not only traps the condensate but also prevents it from spilling out when the beverage glass on which the coaster is mounted is tilted, as when it is placed to the lips for drinking purposes.

Coasters may be divided into two categories: The first type is merely a dish or tray adapted to support a glass. This type of coaster is not mounted on the glass and it affords no protection once the glass is removed therefrom. The second type of coaster is cup-shaped and designed not only to receive a glass but also to cling to it. This type of coaster remains on the glass and is intended to afford protection both when the glass is at rest on a table or like support and when it is in use, as when it is held in the hand and raised to the lips. Coasters made in accordance with the present invention relate to this second category.

Coasters in the second category are made of two different kinds of material, in the main, although special types may be made of special materials. Reference is here made to sponge or foam rubber as one material and to molded non-cellular rubber as the other material. Cellular material in which the cells are connecting, is commonly used in the making of coasters in the second category. The reason is that such material functions in the nature of a sponge to suck up the condensate. However, special precautions must be taken to prevent such coasters from damaging the surfaces of tables and other articles of furniture where they may be placed since the condensate would tend to moisten the entire coaster, including its outer surfaces. It is for this reason that sometimes cellular material with non-connecting cells is used since such material does serve as a moisture barrier. But its inherent disadvantage resides in the fact that it has no sponge action and cannot absorb moisture.

Some manufacturers of coasters have therefore turned to the use of non-cellular molded rubber which serves as a good moisture barrier. Pockets are provided between the coaster and the glass on which it is mounted to catch and hold the condensate. Unfortunately, however, while these pockets function very well when the glass is in an upright position, no provision is made to prevent the condensate from spilling out of these pockets when the glass is tilted.

It is accordingly the object of this invention to provide a molded coaster, made, preferably, of non-cellular rubber, having a built-in condensate trap which not only receives the condensate but also holds it and prevents it from spilling out when the glass is tilted. Although non-cellular rubber is the preferred material, cellular rubber having non-communicating cells, as well as plastics may also be used for the purposes of this invention.

The basis of this invention is a screw thread which is molded into the coaster on its inner cylindrical surface for engagement with the outer cylindrical surface of the glass on which the coaster is mounted. The condensate will travel a spiral or helical path, as defined by the screw thread, down the side of the glass and to the bottom of the coaster. When the glass is tilted, the screw thread will serve as a barrier to prevent the condensate from leaving the coaster. The reason is plain: The condensate may leave the coaster only by traveling the same helical path by which it entered the coaster but in the opposite direction. It cannot do so when the glass is simply tilted.

The invention may assume various forms other than the helical form above described. The basic principle is the provision of a condensate trap which functions in one direction only: it is adapted to receive condensate when the coaster is disposed in generally upright position. But it blocks reverse passage of the condensate when the coaster is inverted in position.

Two such modifications are shown in the drawing, and they possess a common feature consisting of a plurality of ridges corresponding to the spiral thread of the basic form of this invention. These ridges are spaced from each other to permit a downward flow of condensate between them, and their configuration is such that they tend to shed the condensate when the coaster is in upright position, while catching the condensate when the coaster is tilted to inverted position. In one such modification the ridges are generally arcuate in shape, their convex sides being disposed upwardly and their concave sides downwardly when the coaster is disposed in upright position. In the other modification the ridges are generally V-shaped elements whose vertices point downwardly when the coaster is held in upright position, and of course they point upwardly when the coaster is tilted to inverted position. These two shapes, the arcuate and V shapes last above mentioned, are intended to be purely illustrative of the various configurations which in one position would receive and trap the condensate and which in the opposite position would shed it.

The invention is illustrated in the accompanying drawing in which.

Figure 1:
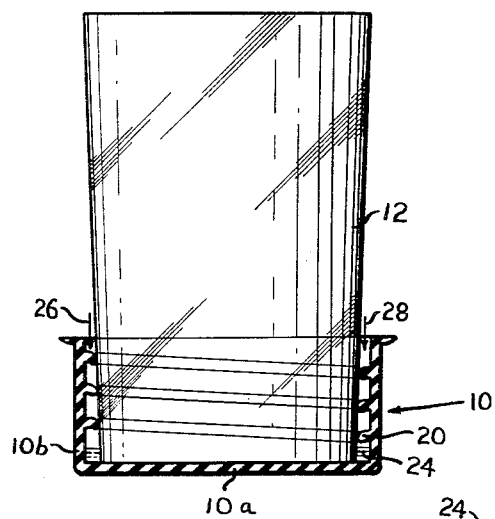
Fig. 1 is a vertical section of a coaster made in accordance with this invention, showing it mounted on a beverage glass.
Figure 3:
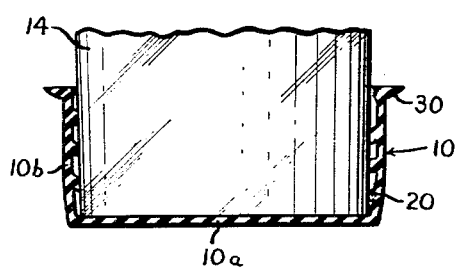
Fig. 3 is a fragmentary view showing the same coaster mounted on a somewhat larger glass, thereby showing how the coaster adapts itself to glasses of different dimensions.
Figure 5:
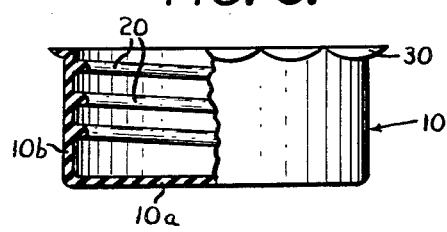
Fig. 5 is a side view thereof partly broken away and in vertical section to show its internal thread construction.

It will be seen in the drawing that coaster 10 is cup-shaped to adapt it to receive a beverage glass 12 or any other similar beverage container. Glass 14 shown in Fig. 3 is slightly different in size and shape from that shown in Fig. 1. Glass 12 shown in Fig. 1 is not precisely cylindrical, being more in the shape of a truncated cone. Glass 14 shown in Fig. 3 is cylindrical but in addition is somewhat larger in diameter at its lower end than is glass 12. It will be understood that coaster 10 is made of somewhat elastic or resilient material, preferably molded natural or synthetic rubber, so that it may yield or stretch to accommodate the relatively large glass 14, although when contracted or relaxed, it is well adapted to accommodate the relatively small glass 12.

As shown in the drawing, the cup-shaped coaster 10 has a bottom wall 10a and a generally cylindrical side wall 10b projecting upwardly from said bottom wall. A helical internal screw thread 20 is formed on the inside of said cylindrical wall 10b and in the preferred form of this invention said screw thread extends three times around the cylindrical wall to form three full windings or convolutions. But this is not a critical aspect of the invention and it will be understood that a greater or smaller number of convolutions may also be utilized in connection with this invention.

The helical thread 20 is simply an inwardly extending flange which is molded upon the inner surface of cylindrical wall 10b and which extends around the wall to form a helix. A helical channel 22 is accordingly formed between the convolutions of said helical thread or flange 20 and it will be understood that it is this helical channel which constitutes a passage for the condensate 24 on its way down to the bottom of the coaster.

Figure 2:
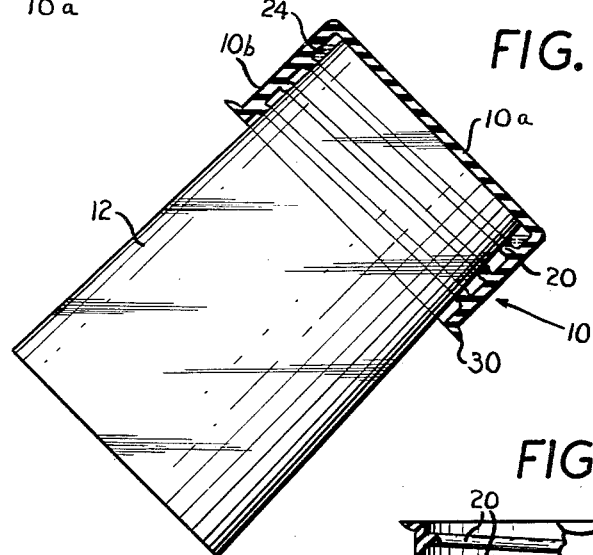
Fig. 2 is a similar view but showing the glass with its said coaster tilted approximately 135 degrees from its Fig. 1 position, showing the glass and said coaster pointing downwardly at an angle of approximately 45 degrees from a completely inverted position.

It will be observed in Figs. 1 and 2 that when a glass 12 is inserted into coaster 10, the helical thread or flange 20 will resiliently and frictionally engage the side wall of the glass in order to attach the coaster thereto. The glass may be lifted from a horizontal support, such as a table, and the coaster will cling or adhere to it so as to remain on the glass until it is manually removed therefrom. Condensate 24 may enter the coaster through the top opening as indicated by arrows 26 and 28 in Fig. 1. The opening is simply the approach to the helical channel 22 and it is formed between the side wall of the glass and the side wall of the coaster, the helical thread or flange 20 functioning as a spacer between these two side walls in order to provide said channel 22 and the approach thereto. The condensate will run down along the helical thread or flange and through said helical channel 22 until it reaches the bottom wall 10a of the coaster where it is trapped as Fig. 1 clearly shows.

Glass 12 with its coaster 10 may be tilted in the manner shown in Fig. 2 and the helical thread or flange 20 will now serve as a barrier preventing the condensate from leaving the coaster. The condensate will be unable to run out of the coaster for the reason that it must follow the same helical course in leaving the coaster as it followed in entering the same. This the condensate will be unable to do when the glass and its coaster are tilted to the position which they are shown to occupy in Fig. 2 or any other angular position between this one and the upright position shown in Fig. 1.

Figure 4:
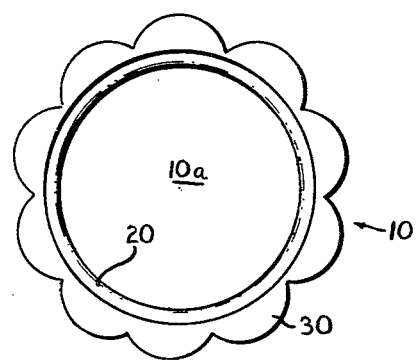
Fig. 4 is a top view of said coaster.

The coaster is shown in Fig. 4 to be provided with a scalloped upper peripheral edge 30. This is purely ornamental and is not to be taken as a critical or indispensable aspect of the invention. Other ornamental forms may be utilized or the coaster may be bare of such ornamentation and it will function equally as well.

Turning now to Fig. 3, it will be noted that the same coaster 10 is applied to the larger glass 14. The coaster, being made of elastic material, automatically adapts itself to the larger proportions of glass 14. The side wall 10b tends to stretch radially outwardly in order to accommodate the glass. This is also true of the helical thread or flange 20. But in addition said helical thread or flange may also be compressed between the side wall of the coaster and the side wall of the glass so as to provide the necessary room for the said glass. Moreover, the helical thread or flange may flex or fold over for the same purpose. Although the helical channel which is thereby defined between the convolutions of the compressed and flexed helical thread or flange is somewhat smaller in cross-section than that formed when a smaller glass is inserted into the coaster, compare Figs. 1 and 3, there remains enough room for the condensate.

Figure 6:
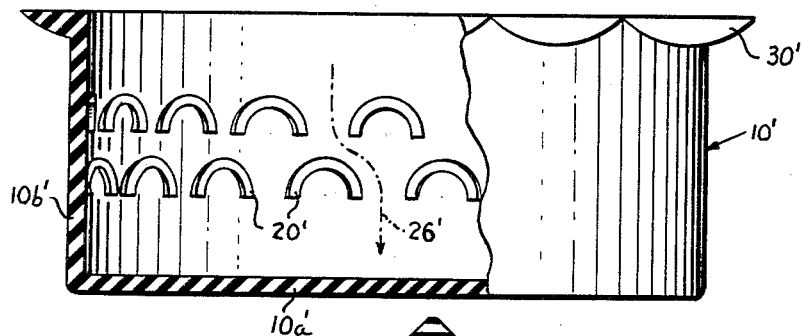
Fig. 6 is a side view partially broken away and in vertical section, showing a coaster made in accordance with a modified form of this invention.
Figure 7:
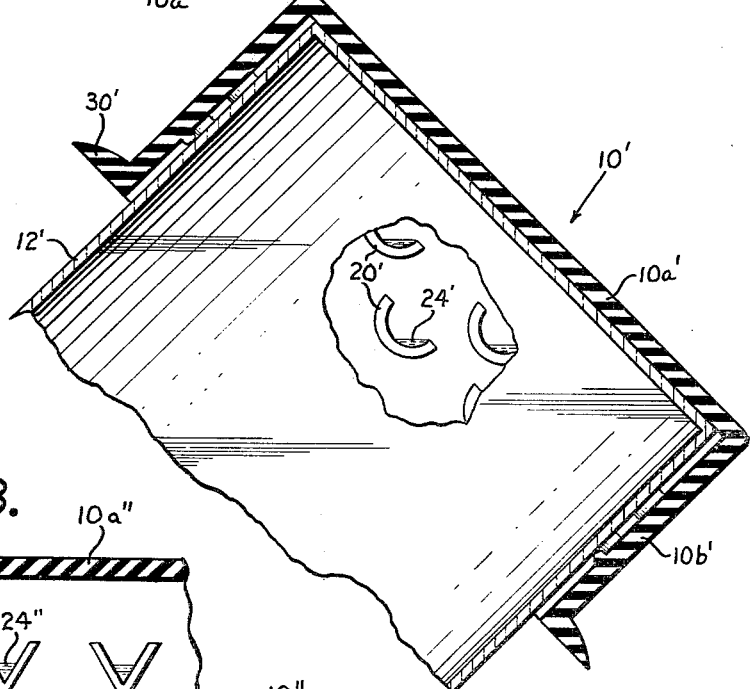
Fig. 7 is a fragmentary sectional view showing said coaster mounted on a glass and tilted to generally inverted or drinking position.

Turning now to Figs. 6 and 7 and to the second form of this invention, it will be observed that a coaster 10' is provided which is generally cylindrical in shape, having a bottom wall 10a' and a cylindrical side wall 10b' having a scalloped lip or flange 30' along its upper peripheral edge. This coaster, like the one previously described, is adapted to receive a liquor glass 12' and to engage it sufficiently so that it will remain on the glass until manually removed therefrom.

Coaster 10' is provided with two rows or tiers of condensate traps 20' which are simply ridges of arcuate or inverted U shape. These arcuate ridges are molded into the coaster on its inner cylindrical wall, both the coaster and its said condensate traps being made of the same material—rubber—in the same mold and in the same molding operation. It will be noted that the condensate traps 20' are spaced from each other and that those in the upper tier are staggered with respect to those in the lower tier.

Condensate 24' travels the irregular route indicated by interrupted line 26' when it descends down the side of the glass and into the coaster. The convex sides or faces of condensate traps 20' face upwardly, and shed the condensate, thereby permitting it to run down along the path designated by interrupted line 26'. When the glass with its attached coaster is titlted to the generally inverted position shown in Fig. 7, the condensate tends to run in the opposite direction from that previously indicated and is caught within the concave portions of said condensate traps 20'.

Figure 8:
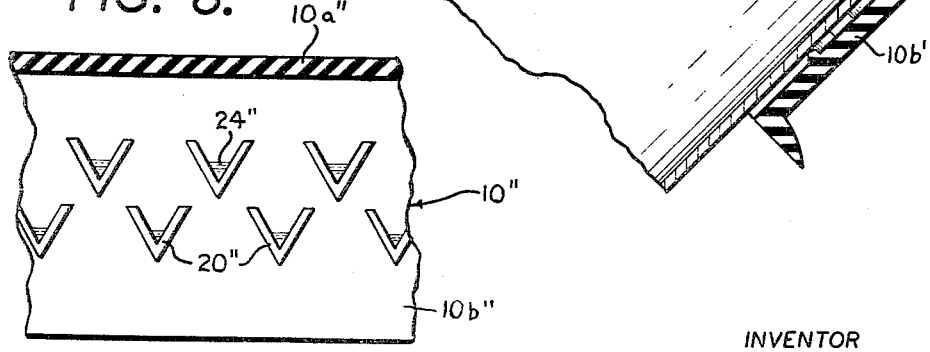
Fig. 8 is a fragmentary view partly in section showing a coaster made in accordance with a third form of this invention.

Fig. 8 shows a further modification of this invention, wherein a coaster 10" is provided with a bottom wall 10a" and a cylindrical side wall 10b". Molded on the inside of said cylindrical wall are two tiers or rows of condensate traps 20" which are of inverted V shape when the coaster is in upright position. These condensate traps are spaced from each other and those of the upper tier are staggered or offset with respect to those in the lower tier. When the coaster and the glass on which it is mounted are in upright position, the condensate 24" is enabled to run down between the condensate traps and into the bottom of the coaster. When the coaster is inverted to its Fig. 8 position, the condensate is caught within the condensate traps, as the drawing clearly shows.

I claim:

1. A coaster for a beverage glass or the like, said coaster being cup-shaped to receive such glass and having a helical flange formed on its inner side wall for engagement with the outer side wall of said glass, a helical channel being formed between the convolutions of the helical flange and adapted to function as a passage for the condensate which may form on the outer wall of the glass, conducting said condensate to the bottom of said coaster.

2. A coaster in accordance with claim 1, which is made of molded resilient material, said helical flange being molded upon the inner side wall of said coaster of the same resilient material as the rest of the coaster, said coaster being adapted to stretch in order to accommodate a relatively large glass and said helical flange being adapted to flex in order to accommodate such relatively large glass.

3. A coaster of the character described, said coaster being generally cylindrical in shape and being adapted to receive and hold a glass within it, said coaster having formed on its inner cylindrical wall a plurality of condensate traps which are oriented to trap condensate only when the coaster is titled to generally inverted position and being adapted to pass the condensate when the coaster is in generally upright position, said condensate traps being formed in a plurality of vertically spaced tiers, said tiers overlapping each other to prevent a back-flow of the condensate trapped thereby when the coaster is tilted, said condensate traps being disposed for engagement with said glass to space the coaster wall from the glass wall and to hold said coaster on said glass.

4. A coaster in accordance with claim 3, wherein the condensate traps comprise a plurality of helical convolutions molded upon the inner cylindrical wall of the coaster.

5. A coaster in accordance with claim 3, wherein the condensate traps comprise a plurality of generally U-shaped ridges molded upon the inner cylindrical wall of the coaster, said U-shaped ridges being arranged in two tiers, the U-shaped ridges in each tier being spaced from each other and being staggered with respect to those of the other tier, each said U-shaped ridge being disposed as a generally inverted U when the coaster is in generally upright position and being disposed as a generally upright U when the coaster is in generally inverted position.

6. A coaster in accordance with claim 3, wherein the condensate traps comprise a plurality of generally V-shaped ridges molded upon the inner cylindrical wall of the coaster, said V-shaped ridges being arranged in two tiers one above the other, the V-shaped ridges in each tier being spaced from each other and being staggered with respect to those of the other tier, said V-shaped ridges being oriented so that their vertices point upwardly when the coaster is in generally upright position and downwardly when the coaster is in generally inverted position.

References Cited in the file of this patent

UNITED STATES PATENTS

| 648,436 | Rider | May 1, 1900 |
| 1,957,263 | Gray | May 1, 1934 |

FOREIGN PATENTS

| 9,676 | Great Britain | June 18, 1903 |